United States Patent [19]

Brimhall

[11] Patent Number: 5,396,266
[45] Date of Patent: Mar. 7, 1995

[54] KINESTHETIC FEEDBACK APPARATUS AND METHOD

[75] Inventor: Owen D. Brimhall, South Jordan, Utah

[73] Assignee: Technical Research Associates, Inc., Salt Lake City, Utah

[21] Appl. No.: 73,540

[22] Filed: Jun. 8, 1993

[51] Int. Cl.$^6$ .................. G09G 1/00; G05G 9/00; B25J 3/00
[52] U.S. Cl. .................. 345/161; 74/471 XY; 335/3; 335/215; 381/190; 414/5
[58] Field of Search .......... 338/128; 414/5; 417/53, 417/322; 381/190, 81; 251/129.06; 310/328, 26; 604/221; 335/3, 215; 367/150; 324/207, 13; 29/594; 137/427.5; 318/118; 192/103 F; 74/471 XY, 471 R; 345/161, 157

[56] References Cited

U.S. PATENT DOCUMENTS

| | | |
|---|---|---|
| 3,618,786 | 11/1971 | Fick . |
| 3,959,751 | 5/1976 | Garshelis .................. 335/3 |
| 4,158,368 | 6/1979 | Clark .................. 137/487.5 |
| 4,308,474 | 12/1981 | Savage et al. .................. 310/26 |
| 4,334,602 | 6/1982 | Armour et al. .................. 192/103 F |
| 4,500,867 | 2/1985 | Ishitobi et al. .................. 338/128 |
| 4,703,464 | 10/1987 | Howarth et al. .................. 367/156 |
| 4,726,741 | 2/1988 | Cusack .................. 417/322 |
| 4,748,441 | 5/1988 | Brzezinski .................. 74/471 XY |
| 4,766,357 | 8/1988 | Glomb, Jr. .................. 318/118 |
| 4,795,317 | 1/1989 | Cusack .................. 417/322 |
| 4,795,318 | 1/1989 | Cusack .................. 417/322 |
| 4,804,314 | 2/1989 | Cusack .................. 417/322 |
| 4,815,946 | 3/1989 | Cusack .................. 417/322 |
| 4,845,450 | 7/1989 | Porzio et al. .................. 335/215 |
| 4,927,334 | 5/1990 | Engdahl et al. .................. 417/322 |
| 4,970,464 | 11/1990 | Williams .................. 324/207.13 |
| 4,972,578 | 11/1990 | Parker et al. .................. 29/594 |
| 4,978,333 | 12/1990 | Broadwin et al. .................. 604/22 |
| 4,986,808 | 1/1991 | Broadwin et al. .................. 604/22 |
| 4,994,698 | 2/1991 | Kliman et al. .................. 310/81 |
| 5,014,321 | 5/1991 | Klein .................. 381/111 |
| 5,039,894 | 8/1991 | Teter et al. .................. 310/26 |
| 5,041,753 | 8/1991 | Clark et al. .................. 310/328 |
| 5,079,460 | 1/1992 | Vranish .................. 310/26 |
| 5,085,400 | 2/1992 | Petersen .................. 251/125.06 |
| 5,101,183 | 3/1992 | Dixon .................. 335/3 |
| 5,103,483 | 4/1992 | Klein .................. 381/190 |
| 5,116,180 | 5/1992 | Fung et al. .................. 414/5 |
| 5,129,789 | 7/1992 | Thornton et al. .................. 417/53 |
| 5,160,918 | 11/1992 | Saposnik et al. .................. 74/471 XY |
| 5,228,356 | 7/1993 | Chuang .................. 345/161 |

Primary Examiner—Alvin E. Oberley
Assistant Examiner—Steven J. Saras
Attorney, Agent, or Firm—J. Winslow Young

[57] ABSTRACT

A kinesthetic feedback apparatus and method whereby braking forces are imposed on a hand-movable lever. The lever is either a joystick or a uniplanar lever, and the braking forces are imposed by a friction plate being pressed against a portion of the lever by a length of magnetostrictive material. An electromagnetic coil around the magnetostrictive material receives a signal from a remote apparatus driven by movement of the lever. The magnitude of the signal is a function of the resistive forces encountered by the remote apparatus so that the braking forces are directly proportional to the resistive forces thereby providing kinesthetic feedback to the person operating the lever.

5 Claims, 3 Drawing Sheets

KINESTHETIC FEEDBACK APPARATUS AND METHOD

Background

1. Field of the Invention

This invention relates to sensory feedback systems and, more particularly, to a novel kinesthetic feedback apparatus and method for imparting a human sensory feedback to an actuator that is human operated.

2. The Prior Art

Human-activated actuators are used in numerous applications for accomplishing significant tasks. Customarily, the actuator is a switch mechanism that transmits an electrical signal to a remote location to activate a motor, hydraulic piston, or the like under the control of the actuator. Other actuators are simply hydraulic valves that control the pressure of the hydraulic fluid to a remote hydraulic piston. A classic example of this latter system is the common backhoe wherein the operator is able to control the digging functions of the backhoe by selectively manipulating corresponding hydraulic valves.

Another common application of the actuator system is an aircraft where the joystick or the control column is used to actuate the various control surfaces on the aircraft. Historically, the joystick was mechanically linked directly to the control surfaces through a series of levers, cables, rods, pulleys, etc. However, with the advent of faster, larger, and/or more sophisticated aircraft and the need for more precise control along with the greater forces required to move the control surfaces, most modern aircraft utilize what is known as the "fly-by-wire" system for aircraft control. As the name implies, the joystick or control column serves as the actuator which sends electrical signals to the various hydraulic and/or electrical systems located throughout the aircraft. These systems, in turn, move the selected control surfaces in response to movements of the joystick. Persons operating these types of actuators and aircraft pilots in particular are discomfited by the lack of kinesthetic feedback through the fly by wire joystick. This is particularly important because the sensory data received by the pilot through the joystick provides useful information about the performance of the aircraft.

The integration of human control capability into a robotic application is another area of interest to persons in that field. One particular advantage of a robotic application is that such a system combines the cognitive capabilities of the human with strength and durability of the robot. Advantageously, robotic applications enable the human to operate in real time in lethal or otherwise hazardous environments by remotely controlling the manipulation of the robot. Significant effort has been expended in developing sensors, end effectors, and exoskeletal systems to control the motions of the robotic arms. Since the human hand is highly adapted for fine manipulations, much work has been done to produce a small hand-size exoskeleton which can receive a human hand.

However, in the absence of sophisticated or otherwise complicated systems built into the actuators, joysticks, and exoskeletons the operator of these devices is unable to accurately determine the degree of force being exerted on an object by the remote system. It would, therefore, be an advancement in the art to provide a lightweight, sensitive, kinesthetic feedback system for enabling the operator to receive accurate sensory input from the actuator system. It would also be an advancement in the art to provide a person operating a robotic device with a tactile sensation representative of that encountered by the robot. Such a novel apparatus and method is disclosed and claimed herein.

BRIEF SUMMARY AND OBJECTS OF THE INVENTION

The present invention utilizes the unique properties of a magnetostrictive material to create a clutch-like or brake mechanism to create a braking action between two moving parts of an actuator. The degree of braking action is in direct correlation with the resistance encountered by a robotic device controlled by movement of the actuator. The actuator mechanism is configured either as a simple lever arm having its motion limited to a single plane or as a joystick having the full 360 degree range of motion provided by a hemispherical joint surface. In either configuration a magnetostrictive brake mechanism is used to create resistive forces against further movement of the actuator to provide a kinesthetic feedback mechanism to the actuator, the kinesthetic feedback being in the form of a resistive force that is sensed tactilely by the operator.

It is, therefore, a primary object of this invention to provide improvements in sensory feedback systems for actuators.

It is another primary object of this invention to provide improvements in the method of providing a sensory feedback to an actuator mechanism.

Another object of this invention is to provide a simple, electrically operated brake mechanism for an actuator.

Another object of this invention is to provide a controllable brake mechanism on an actuator whereby the resistive force of the brake mechanism is directly proportional to the resistive forces encountered by a robotic device driven by the actuator.

Another object of this invention is to provide a brake mechanism for a uniplanar lever mechanism.

Another object of this invention is to provide a brake mechanism for a joystick.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
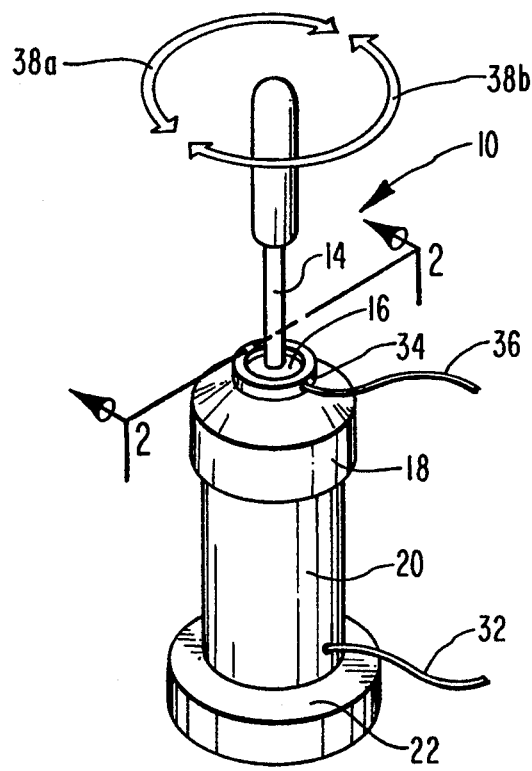
FIG. 1 is a perspective view of a first preferred embodiment of the novel, kinesthetic feedback apparatus of this invention shown in the configuration of a joystick.

The invention is best understood by reference to the drawing wherein like parts are designated by like numerals throughout and taken in conjunction with the following description.

General Discussion

Magnetostrictive materials are materials which change shape under the influence of a magnetic field. Magnetostrictive materials have been available for over a century and came into common use in the 1950's with the use of nickel-based alloys. These alloys were limited to strains in the order of 50 ppm. Certain piezoceramics improved this performance with strains of approximately 250 ppm.

A relatively new magnetostrictive material, Terfanol-D, was discovered during research into sonar by the U.S. Navy. Terfanol-D is an alloy of terbium, dysprosium, and iron. Terfanol-D has significantly improved the achievable strains as compared to previously available magnetostrictive materials by a factor of about 40 times. The achievable strains using Terfanol-D is even about ten times that of piezoceramics such as lead titanate zirconate (PZT). Terfanol-D offers very high magnetostrictive strain capabilities thereby allowing much greater power output at lower operating power. These results are achievable using relatively low intensity magnetic fields. Terfanol-D systems can also operate at low voltages as compared to piezoceramics. Terfanol-D demonstrates a low modulus and has a rapid response time as well as being able to efficiently transmit large amounts of energy in a small volume.

Numerous devices have been set forth in the patent literature, each of which incorporates a body of magnetostrictive material as the motive force for operation of these devices. A representative sampling of the patent literature reveals the following U.S. Patents that relate to magnetostrictive materials and/or magnetostrictive based devices: U.S. Pat. Nos. 3,959,751; 4,158,368; 4,308,474; 4,334,602; 4,703,464; 4,726,741; 4,766,357; 4,795,317; 4,795,318; 4,804,314; 4,815,946; 4,845,450; 4,927,334; 4,970,464; 4,972,578; 5,101,183; 4,986,808; 4,978,333; 4,994,698; 5,014,321; 5,039,894; 5,041,753; 5,079,460; 5,085,400; 5,103,483; and 5,129,789.

The present invention advantageously utilizes the change in shape of the magnetostrictive material to create a braking-like action against a moving joint such as in a joystick or a lever arm. The control signal for the braking action is initiated from a remote object being driven by movement of the joystick or lever arm. The magnitude and duration of the braking action is a function of the resistive forces encountered by the remote object. The desired goal for this braking action is to create a sensory feedback system that mimics the forces encountered by the controlled device as though the operator's hand were directly placed on the remote object. This kinesthetic feedback coupled with visual feedback substantially enhances the operator's ability to accomplish tasks with greater speed and with remarkably improved accuracy.

Detailed Description

Figure 2:
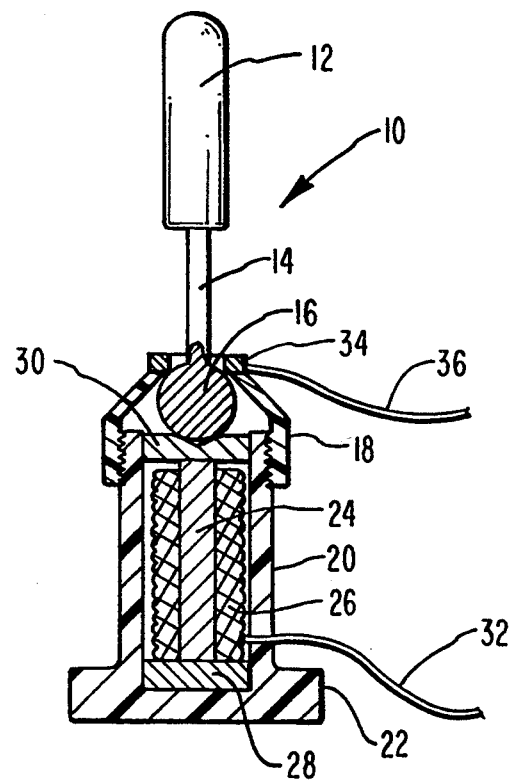
FIG. 2 is a cross-sectional view of the joystick of FIG. 1 taken along lines 2—2 of FIG. 1.

Referring now to FIGS. 1 and 2, a joystick incorporating the novel kinesthetic feedback system of this invention is shown generally at 10 and includes a handle 12, a joystick lever 14, a universal or ball joint 16, a friction cap 18, and a housing 20 mounted to a base 22. Interiorly, housing 20 includes a coaxially disposed magnetostrictive rod 24 surrounded by a coil 26. An optional permanent magnet 28 is placed at the bottom of magnetostrictive rod 24 while a friction plate 30 is placed at the top. Friction cap 18 provides a friction stop against which ball joint 16 is pressed by friction plate 30 when the length of magnetostrictive rod is increased upon the application of electrical current in coil 26. Electrical power to coil 26 is supplied through a power line 32. A position sensor 34 surrounds the base of joystick lever 14 and serves as a position sensor to sense the position of joystick lever 14. The position of handle 12, hence, joystick lever 14, is transmitted as a signal through a signal line 36 to the remote device (in this instance, computer 40, FIG. 3). Position sensor 34 is a conventional sensor coil and is shown schematically for convenience in describing the operation of joystick 10. Position sensor 34 is any suitable, commercially available sensor and can be selected from various systems including, for example, potentiometers, Hall effect encoders, and various types of optical encoders. The range of motion of handle 12 is indicated schematically by arrows 38a and 38b which are intended to show the full range of universal or 360° motion for handle 12 and, more particularly, joystick 10.

Figure 3:
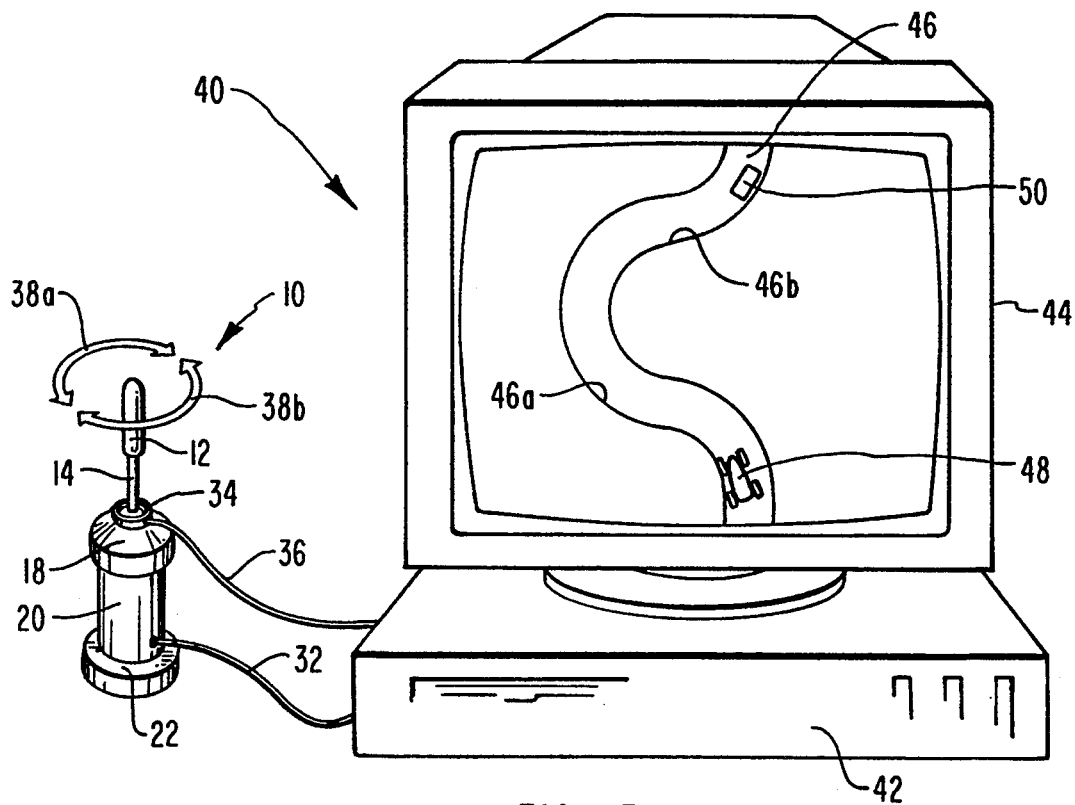
FIG. 3 is a schematic of the joystick of FIG. 1 shown in the environment of a computer.

Referring now also to FIG. 3, joystick 10 is shown in the environment of a computer shown generally at 40. Computer 40 includes a signal processor 42 and a monitor 44. Monitor 44 is shown having a computer-based game displayed thereon. In the illustrated embodiment of the computer-based game, a racetrack 46 is shown having a curvilinear path defined by sidewalls 46a and 46b. A race car 48 on racetrack 46 is controllable through corresponding movements of joystick 10 which movements are intended to direct the traverse of race car 48 along racetrack 46. Signal processor 42 scrolls the image on monitor 44 to thereby provide for the traverse of race ar 48 along racetrack 46. Racetrack 46 includes obstacles 50 and other race cars, obstacles, etc. (not shown) to test the skill of the operator (not shown) in the manipulation of race car 48 along racetrack 46 through selective movement of joystick 10.

Signal processor 42 creates race car 48 and race track 46 on monitor 44 and continuously calculates the relationship between race car 48 and racetrack 46 to thereby provide feedback information to joystick 10. For example, if race car 48 is determined to have struck sidewall 46a, an appropriate signal representing this collision is sent via power line 32 into coil 26 to cause magnetostrictive rod to expand linearly and push against friction plate 30. This motion of friction plate 30 frictionally engages ball joint 16 between friction plate 30 and friction cap 18 to impose a braking force against the further leftward travel of handle 12. Similarly, in the event race car 48 is determined to have struck obstacle 50, further forward movement of joystick 10 is again stopped by the foregoing clamping action of ball joint 16 between friction plate 30 and friction cap 18.

The foregoing is merely one, very simplistic, discussion of possible applications of the novel kinesthetic feedback system for the novel joystick 10 apparatus of this invention. This illustrated embodiment relates to a computer-based game although the same principles apply to mechanical objects as will be described hereinafter.

Figure 4:
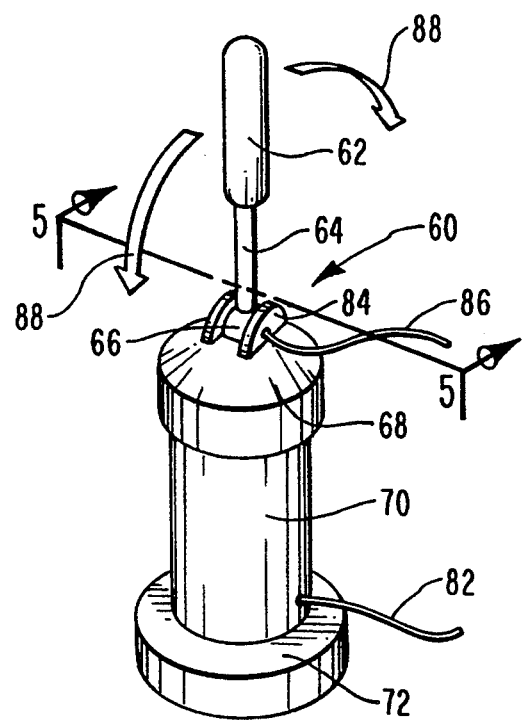
FIG. 4 is a perspective view of a second preferred embodiment of the novel sensory feedback apparatus of this invention shown in the configuration of an actuator lever operable in a single plane.
Figure 5:
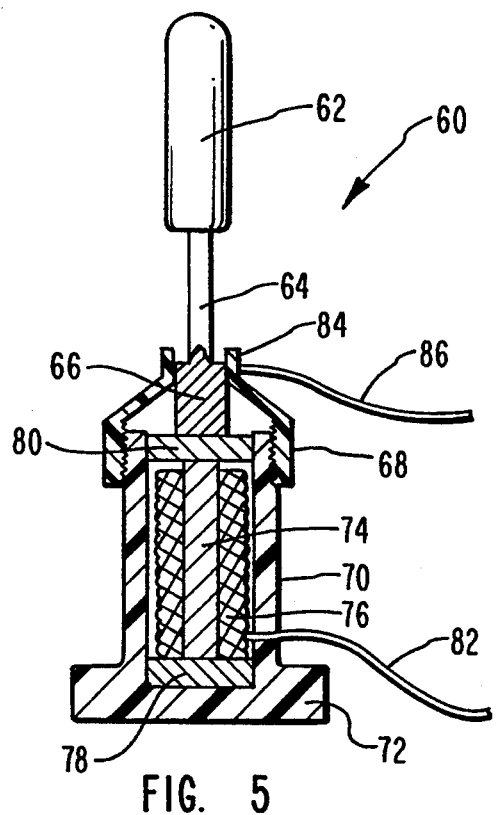
FIG. 5 is a cross-sectional view of the actuator lever of FIG. 4 taken along lines 5—5 of FIG. 4.

Referring now to FIGS. 4 and 5, a single plane or uniplanar lever is shown generally at 60 and includes a handle 62, a lever arm 64, a cylindrical pivot 66, a friction cap 68, and a housing 70 mounted to a base 72. Friction cap 68 is threadedly and adjustably mounted to a housing 70. Interiorly, the internal components of housing 70 are essentially identical to that of housing 20 (FIG. 2) in that housing 70 includes a magnetostrictive rod 74 surrounded by a coil 76 and having an optional permanent magnet 78 at its bottom and a friction plate 80 at its top. The major difference between joystick 10 and uniplanar lever 60 is that cylindrical pivot 66 is designed to restrict the movement of lever arm 64 and handle 62 to a single plane of motion, hence, the name, uniplanar. A position sensor 84 adjacent lever arm 64 senses the position of lever arm 64 as a function of the position of handle 62 and transmits this signal over signal line 86. Position sensor 84, like position sensor 34, is selected from any suitable, commercially available sensor system including, for example, a potentiometer, a Hall effect encoder, or an optical encoder. The position or range of motion of handle 62 is shown schematically as uniplanar arrow 88.

Figure 6:
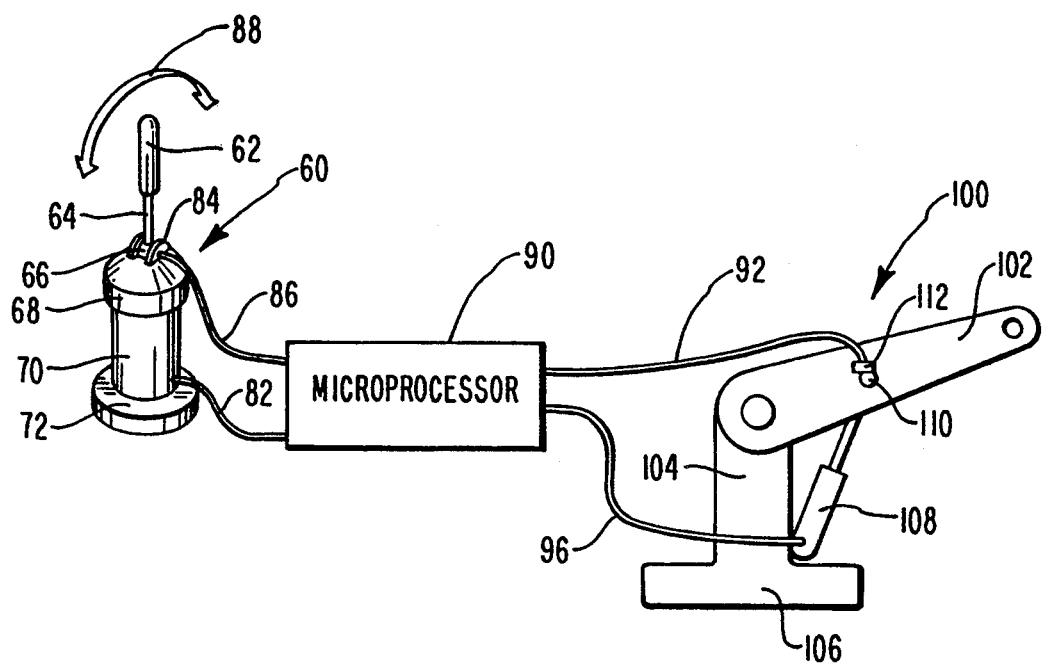
FIG. 6 is a schematic of the actuator lever of FIG. 4 shown in the environment of a hydraulically operated arm.

Referring now also to FIG. 6, a mechanical device operated by uniplanar lever 60 is shown generally at 100 and includes a movable arm 102, a basal arm 104 extending upwardly from a base 106 and a hydraulic piston 108 mounted between base 106 and movable arm 102 at a pivot 110. Movable arm 102 is illustrated schematically and, as such, is intended to represent any suitable mechanical arm regardless of size, shape, or configuration since the basic principles of its operation are essentially identical. For example, movable arm 102 could be the support arm for a backhoe, the support arm for an earthmover blade, or the support arm for the cutting blade of a surgical instrument.

Movement of movable arm 102 is controlled by movement of uniplanar lever 60 as sensed by position sensor 84, the signal from which travels through signal line 86 to microprocessor 90. The processed signal is then transmitted to a control valve (not shown) in hydraulic piston 108 by transmission line 96. The range of extension of hydraulic piston 108 is a direct function of the range of movement of uniplanar lever 60. A sensor 112 at pivot 110 transmits a signal through signal line 92 to microprocessor 90 which signal is a function of the forces and/or obstacles encountered by movable arm 102 as it is moved by hydraulic piston 108. This signal is processed in microprocessor 90 and relayed through power line 82 to coil 76 where it causes magnetostrictive rod 74 to elongate correspondingly. This elongation of magnetostrictive rod 74 pushes friction plate 80 upwardly against cylindrical pivot 66 pressing it upwardly against friction cap 68 thereby frictionally engaging cylindrical pivot 66 in a frictional force that is a function of the force encountered upon the movement of movable arm 102.

The Method

Referring again to FIGS. 1-3, joystick 10 is electrically coupled to signal processor 42 by signal line 32 so that movements of handle 12 can be translated into corresponding movements of race car 48. Position sensor 34 provides the basic information as to the position of handle 12 while signal processor 42 translates this information into the appropriate control instructions to race car 48. Signal processor 42, in turn, evaluates the position of race car 48 relative to racetrack 46, obstacle 50, and the like, and interprets this information to provide a feedback signal to joystick 10. In particular, if race car 48 encounters obstacle 50 signal processor 42 sends a feedback signal through power line 32 where coil 26 causes magnetostrictive rod 24 to elongate, the degree of elongation being a direct function of the particular feedback signal created by signal processor 42. Elongation of magnetostrictive rod 24 pushes friction plate 30 upwardly against ball joint 16 frictionally engaging ball joint 16 between friction plate 30 and friction cap 18. The user (not shown) operating joystick 10 feels this restrictive force on ball joint 16 as a resistance to movement of handle 12 thus obtaining a kinesthetic feedback through joystick 10.

The foregoing kinesthetic feedback can be selectively applied through joystick 10 also as a warning system to the user (not shown) when race car 48, for example, is approaching obstacle 50. Correspondingly, these same warning signals can be fed back through joystick 10 in the event an aircraft (not shown) controlled by joystick 10 is approaching a stall condition, or the like, and there is a need to warn the pilot (not shown) of the danger of this stall condition. Accordingly, joystick 10 is ideally suited for imparting the kinesthetic feedback to the pilot (not shown) such that control of the aircraft (not shown) is much more realistically accomplished.

Referring now again to FIGS. 4–6, uniplanar lever 60 is moved as shown by arrow 88 with microprocessor 90 translating these movements as sensed by position sensor 84 into corresponding signals to hydraulic piston 108 which then moves movable arm 102 as a function of the movement of uniplanar lever 60. Resistance to movement of movable arm 102 is sensed by sensor 112 and translated by microprocessor 90 into a signal which is sent via power line 82 to coil 76 to cause an elongation of magnetostrictive rod 74. The elongation of magnetostrictive rod 74 is proportional to the strength of the signal received from microprocessor 90. The elongation of magnetostrictive rod 74 presses friction plate 80 upwardly to force cylindrical pivot 66 against friction cap 68. This frictional engagement of cylindrical pivot 66 between friction plate 80 and friction cap 68 creates a kinesthetic feedback to provide a tactile sense to the user (not shown).

For example, if moveable arm 102 is an actuator arm for a backhoe (not shown) and the backhoe strikes a rock or other obstacle (not shown) the operator (not shown) will receive the tactile sensation of the same through the novel kinesthetic feedback system of this invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A kinesthetic feedback system for a human activated lever apparatus comprising:

a lever, said lever including a rotational member and a lever arm extending outwardly from said rotational member, said lever including a housing and a friction cap adjustably mounted to said housing, said rotational member being mounted inside said housing and in frictional contact inside said friction cap;

a first signal means on said lever for generating a first signal as a function of the position of said lever;

an actuator means movable as a function of said first signal;

a second signal means on said actuator means for generating a second signal as a function of resistive forces encountered by said actuator means upon being moved by said first signal; and a brake means on said lever, said brake means imposing a braking force on said lever as a function of said second signal, said brake means including a magnetostrictive body, a coil for inducing dimensional changes in said magnetostrictive body, and a friction plate movable upon dimensional changes in said magnetostrictive body, said friction plate being located inside said housing and pressing said rotational member against said friction cap thereby imposing said braking force on said lever, said magnetostrictive body comprising an elongated rod having a proximal end and a distal end, said coil being wrapped about said rod and with said proximal end in contact with said friction plate.

2. The kinesthetic feedback system defined in claim 1 wherein said lever comprises a lever selected from the group consisting of a uniplanar lever and a universal joystick.

3. The kinesthetic feedback system defined in claim 1 wherein said actuator means comprises a computer generated image and said second signal means comprises a computer generated second signal as a function of computer generated forces encountered by said computer generated image.

4. A kinesthetic feedback system for a human actuated lever apparatus comprising:

a housing;

a lever pivotally mounted on a pivot joint in said housing;

a first sensor means in said housing for sensing the position of said lever, said first sensor means of generating a first signal as a function of said position of said lever;

an actuator means movable as a function of said first signal;

a second sensor means on said actuator means, said second sensor means generating a second signal as a function of forces encountered by said actuator means; and a brake means in said housing for braking said lever as a function of said second signal, said brake means including a friction plate in frictional engagement with said pivot joint and a magnetostrictive rod for pushing said friction plate into said frictional engagement, said magnetostrictive rod comprising an electromagnetic coil for receiving said second signal, said braking of said lever imparting a kinesthetic feedback to said lever.

5. A method for providing a kinesthetic feedback to a lever comprising the steps of:

obtaining a lever;

sensing movement of said lever with a first sensor on said lever, said first sensor sensing movement of said lever as a first signal;

transmitting said first signal to a remote device, said first signal actuating said remote device;

sensing forces encountered by said remote device with a second sensor as a second signal;

returning said second signal to said lever;

placing a friction plate against a movable portion of said lever;

orienting a length of magnetostrictive material longitudinally against said friction plate while forming a coil around said length of magnetostrictive material; and braking movement of said lever as a function of said second signal by pressing said friction plate against said movable portion of said lever as said function of said second signal by passing said second signal through said coil thereby creating an electromagnetic field, said electromagnetic field changing said length of magnetostrictive material thereby pressing said friction plate with said length of magnetostrictive material.

* * * * *